(12) United States Patent
Yonekubo et al.

(10) Patent No.: US 11,237,398 B2
(45) Date of Patent: Feb. 1, 2022

(54) HEAD-MOUNTED DISPLAY APPARATUS

(71) Applicant: SEIKO EPSON CORPORATION, Tokyo (JP)

(72) Inventors: Masatoshi Yonekubo, Suwa-gun Hara-mura (JP); Akio Fukase, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/204,224

(22) Filed: Mar. 17, 2021

(65) Prior Publication Data

US 2021/0199979 A1 Jul. 1, 2021

Related U.S. Application Data

(63) Continuation of application No. 16/456,001, filed on Jun. 28, 2019, now Pat. No. 10,983,357.

(30) Foreign Application Priority Data

Jun. 29, 2018 (JP) .............................. JP2018-124798

(51) Int. Cl.
*G09G 5/00* (2006.01)
*G02B 27/01* (2006.01)
*G02B 27/09* (2006.01)

(52) U.S. Cl.
CPC ..... *G02B 27/0176* (2013.01); *G02B 27/0172* (2013.01); *G02B 27/0972* (2013.01);
(Continued)

(58) Field of Classification Search
CPC ............ G02B 27/0176; G02B 27/0172; G02B 27/0972; G02B 2027/0114; G02B 2027/0178
(Continued)

(56) References Cited

U.S. PATENT DOCUMENTS

| 6,219,112 | B1 | 4/2001 | Yoneyama et al. |
| 2003/0169507 | A1 | 9/2003 | Hashizume et al. |
| 2006/0170886 | A1* | 8/2006 | Kitabayashi ........... G03B 43/00 353/122 |
| 2013/0286360 | A1 | 10/2013 | Kawamura et al. |

(Continued)

FOREIGN PATENT DOCUMENTS

| JP | 2007-078779 A | 3/2007 |
| JP | 2012-018293 A | 1/2012 |
| JP | 2013-228530 A | 11/2013 |

OTHER PUBLICATIONS

Dec. 30, 2020 Notice of Allowance Issued in U.S. Appl. No. 16/456,001.

*Primary Examiner* — Jonathan M Blancha
(74) *Attorney, Agent, or Firm* — Oliff PLC

(57) ABSTRACT

A head-mounted display apparatus includes a cross dichroic prism including four triangular prisms that are mutually bonded, and a first dichroic film and a second dichroic film provided between adjacent prisms of the four triangular prisms, a plurality of display panels arranged respectively opposite to a plurality of light incident planes of the cross dichroic prism, and a projection optical system configured to project light emitted from the cross dichroic prism onto a pupil of a user. The cross dichroic prism includes an optically imperfect part at a center of a bonded part of the four triangular prisms. A ratio between an aerial conversion length from each of light-emission planes of the plurality of display panels to the center of the bonded part, and a width of the optically imperfect part, is greater than or equal to 250:1.

9 Claims, 10 Drawing Sheets

(52) U.S. Cl.
CPC ............... *G02B 2027/0114* (2013.01); *G02B 2027/0178* (2013.01)

(58) Field of Classification Search
USPC .......................................................... 345/8
See application file for complete search history.

(56) References Cited

U.S. PATENT DOCUMENTS

2015/0042961 A1* 2/2015 Miyamae ............. G02B 27/149
 353/33
2015/0279114 A1* 10/2015 Ekubo .................... G06T 19/006
 345/633

* cited by examiner

| RATIO | 650 : 1 |
|---|---|
| IMAGE |  |
| CROSS-SECTIONAL BRIGHTNESS |  |
| SENSORY EVALUATION | ◎ |

FIG. 6A

| RATIO | 400 : 1 |
|---|---|
| IMAGE | |
| CROSS-SECTIONAL BRIGHTNESS | |
| SENSORY EVALUATION | ○ |

FIG. 6B

| RATIO | 250 : 1 |
|---|---|
| IMAGE |  |
| CROSS-SECTIONAL BRIGHTNESS |  |
| SENSORY EVALUATION | △ |

FIG. 6C

| RATIO | 133:1 |
|---|---|
| IMAGE | |
| CROSS-SECTIONAL BRIGHTNESS | |
| SENSORY EVALUATION | × |

FIG. 6D

HEAD-MOUNTED DISPLAY APPARATUS

CROSS-REFERENCE TO RELATED APPLICATION(S)

This application is a continuation of U.S. application Ser. No. 16/456,001 filed Jun. 28, 2019, which is based on and claims priority under 35 U.S.C. 119 from Japanese Patent Application No. 2018-124798 filed on Jun. 29, 2018. The contents of the above applications are incorporated herein by reference in their entireties.

BACKGROUND

1. Technical Field

The present disclosure relates to a head-mounted display apparatus.

2. Related Art

A head-mounted display apparatus such as a head-mounted display, which is used while worn on an observer's head, is known as a recent example of a wearable information device. To achieve a brighter color image display in such a head-mounted display apparatus, it is necessary to employ a method that synthesizes image light of each R, G, and B color, which are generated by three corresponding display devices. A cross dichroic prism such as that disclosed in JP-A-2007-78779 is known as a synthesizing optical system that synthesizes image light of each R, G, and B color. This cross dichroic prism includes four triangular prisms joined together by an adhesive, and a dichroic film provided at the junction boundaries of the triangular prisms.

However, with such a cross dichroic prism, optically imperfect parts arise at a center of a bonded part of the triangular prisms. Optically imperfect parts produce differences in the brightness of the image lights synthesized by the cross dichroic prism. Brightness differences in the image lights appear as bright/dark bands or color bands when viewing the image, and are thus a cause of decreased image quality.

SUMMARY

A head-mounted display apparatus according to one aspect of the present disclosure includes a cross dichroic prism including four triangular prisms that are mutually bonded and a first dichroic film and a second dichroic film provided between adjacent prisms of the four triangular prisms, a plurality of display panels arranged respectively opposite to a plurality of light incident planes of the cross dichroic prism, and a projection optical system configured to project light emitted from the cross dichroic prism, wherein the cross dichroic prism includes an optically imperfect part at a center of a bonded part of the four triangular prisms, and a ratio between an aerial conversion length from each of light-emission planes of the plurality of display panels to the center of the bonded part and a width of the optically imperfect part is greater than or equal to 250:1.

In the head-mounted display apparatus according to the above-described aspect, the ratio between the aerial conversion length and the width of the optically imperfect part may be greater than or equal to 400:1.

In the head-mounted display apparatus according to the above-described aspect, the plurality of display panels may include a first display panel configured to emit first image light in a blue wavelength band, a second display panel configured to emit second image light in a green wavelength band, and a third display panel configured to emit third image light in a red wavelength band, the first dichroic film may transmit the first image light emitted from the first display panel and the second image light emitted from the second display panel, and reflect the third image light emitted from the third display panel, the second dichroic film may transmit the second image light emitted from the second display panel and the third image light emitted from the third display panel, and reflect the first image light emitted from the first display panel, and the second dichroic film may be formed divided at an intersecting part where the second dichroic film intersects with the first dichroic film.

In the head-mounted display apparatus according to the above-described aspect, the optically imperfect part at the intersecting part may be provided in the second dichroic film, and light traveling through the intersecting part may be emitted from the cross dichroic prism as yellow light.

In the head-mounted display apparatus according to the above-described aspect, the plurality of display panels may include a first display panel configured to emit first image light in a blue wavelength band, a second display panel configured to emit second image light in a green wavelength band, and a third display panel configured to emit third image light in a red wavelength band, the first dichroic film may transmit the first image light emitted from the first display panel and the second image light emitted from the second display panel, and reflect the third image light emitted from the third display panel, the second dichroic film may transmit the second image light emitted from the second display panel and the third image light emitted from the third display panel, and reflect the first image light emitted from the first display panel, and the first dichroic film may be formed divided at an intersecting part where the first dichroic film intersects with the second dichroic film.

In the head-mounted display apparatus according to the above-described aspect, the optically imperfect part at the intersecting part may be provided in the first dichroic film, and light traveling through the intersecting part may be emitted from the cross dichroic prism as cyan light.

In the head-mounted display apparatus according to the above-described aspect, each of the plurality of display panels may be a selfluminous panel. Furthermore, the selfluminous panel may be an organic EL panel.

BRIEF DESCRIPTION OF THE DRAWINGS

FIG. 6A is a diagram illustrating an evaluation result at a ratio of 650:1.

FIG. 6B is a diagram illustrating an evaluation result at a ratio of 400:1.

FIG. 6C is a diagram illustrating an evaluation result at a ratio of 50:1.

FIG. 6D is a diagram illustrating an evaluation result at a ratio of 133:1.

DESCRIPTION OF EXEMPLARY EMBODIMENTS

Exemplary embodiments of the present disclosure will be described below using the drawings. Note that, in each of the drawings below, constituent elements are illustrated on different dimensional scales to increase the visibility of each constituent element.

Exemplary Embodiment 1

A head-mounted display apparatus according to this exemplary embodiment is an example of a head-mounted display used while worn on a user's head.

In the description below, the term "head-mounted display" is abbreviated "HMD".

Figure 1:
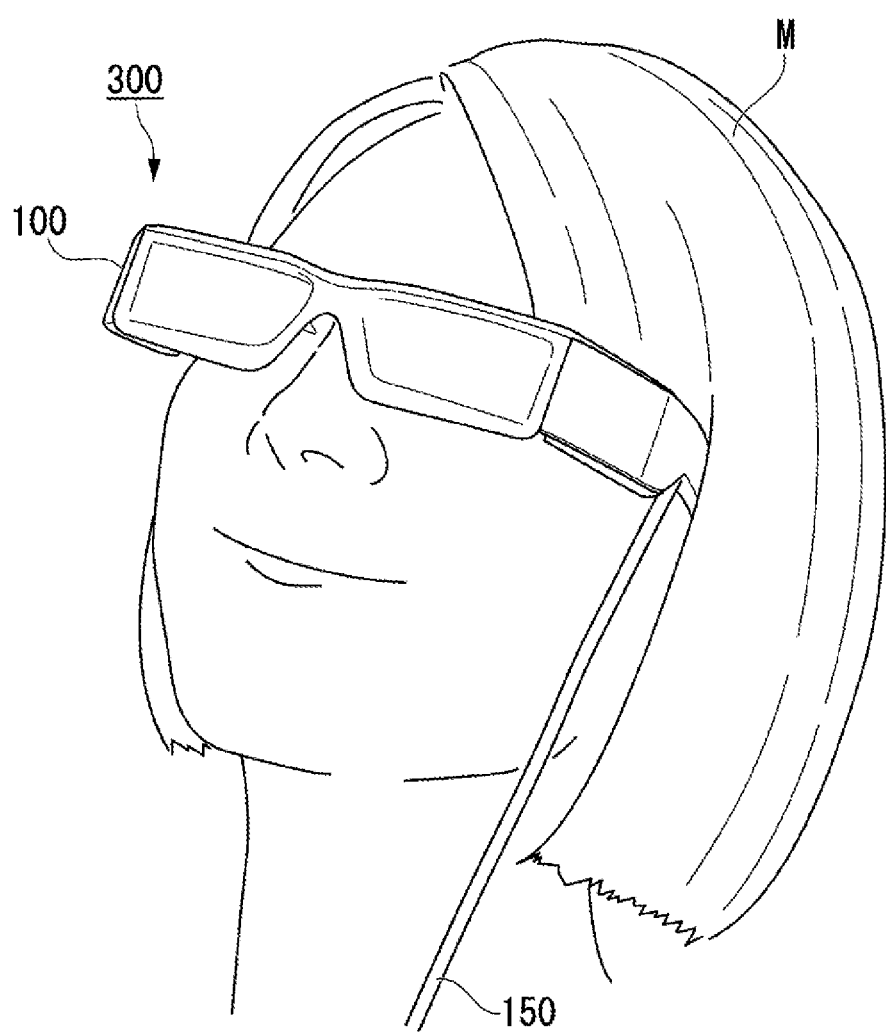
FIG. 1 is a diagram illustrating a user wearing an HMD according to an exemplary embodiment.
Figure 2:
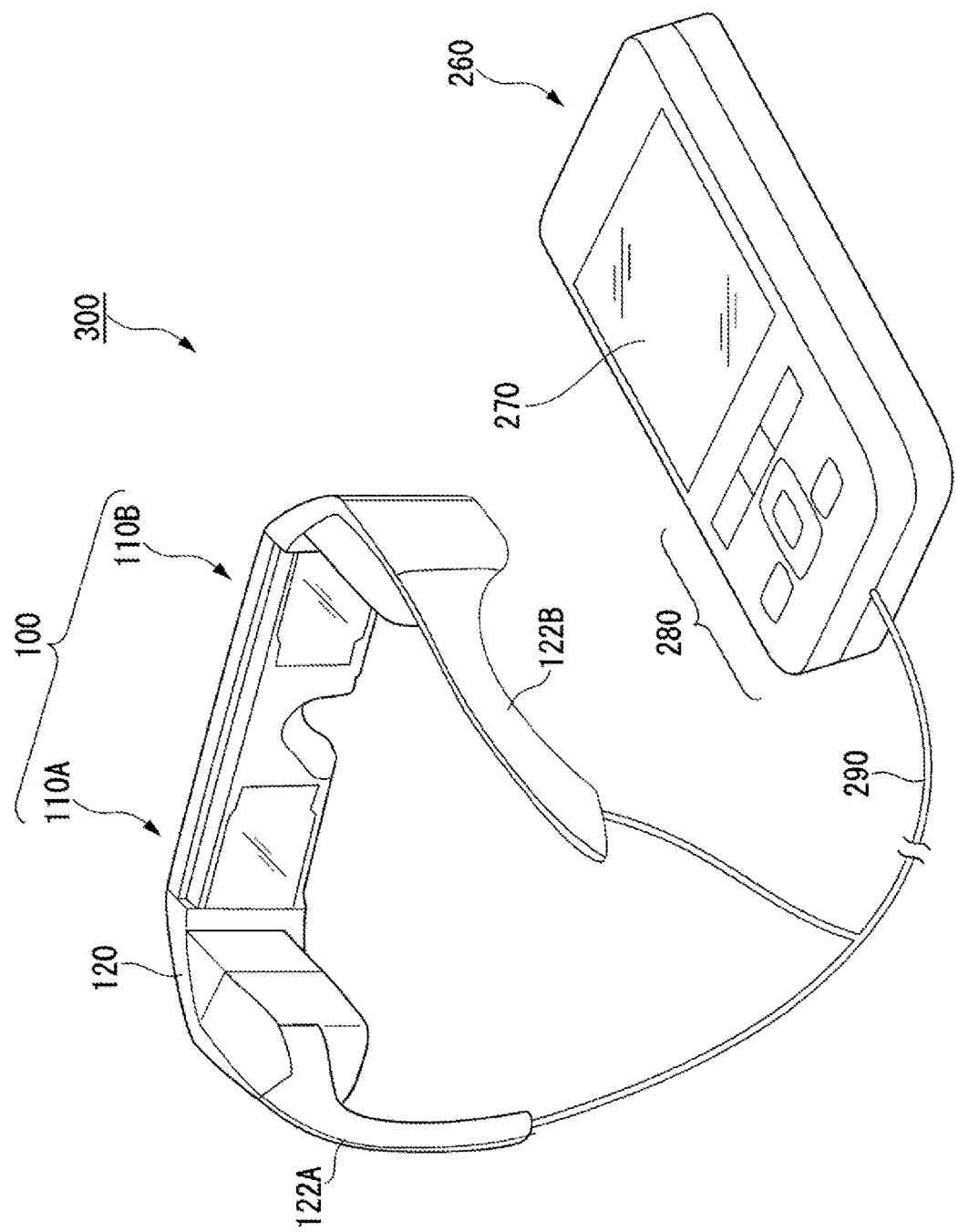
FIG. 2 is a perspective view of an HMD according to Exemplary Embodiment 1.

FIG. 1 is a diagram illustrating a user wearing an HMD according to this exemplary embodiment. FIG. 2 is a perspective view of the HMD according to this exemplary embodiment.

As illustrated in FIG. 1, a head-mounted display apparatus (HMD) 300 of this exemplary embodiment is used by being worn on the user's head as the user would wear eyeglasses. The HMD 300 of this exemplary embodiment is a non-transparent HMD that covers the user's eyes.

As illustrated in FIG. 2, the HMD 300 includes a display unit 100 having an eyeglasses-like shape, and a controller 260 small enough for the user to be able to hold the controller 260 in his or her hand. The display unit 100 and the controller 260 are communicatively coupled by a wire or wirelessly. In this exemplary embodiment, each of a left-eye image display unit 110A and a right-eye image display unit 110B constituting the display unit 100, and the controller 260, are communicatively coupled by wire via a cable 290, and exchange image signals, control signals, and the like.

The display unit 100 includes a main frame 120, the left-eye image display unit 110A, and the right-eye image display unit 110B. The controller 260 includes a display screen 270 and an operation button unit 280.

The display screen 270 displays various types of information, instructions, and the like to provide to the user, for example. The main frame 120 includes a pair of temple portions 122A and 122B that rest on the ears of the user. The main frame 120 is a member for supporting the left-eye image display unit 110A and the right-eye image display unit 110B.

The right-eye image display unit 110B and the left-eye image display unit 110A have similar configurations, and the constituent elements inside both image display units are symmetrically disposed. Thus, in the following, the right-eye image display unit 110B is singly described in detail as an image display unit 110, and a description of the left-eye image display unit 110A is omitted.

Figure 3:
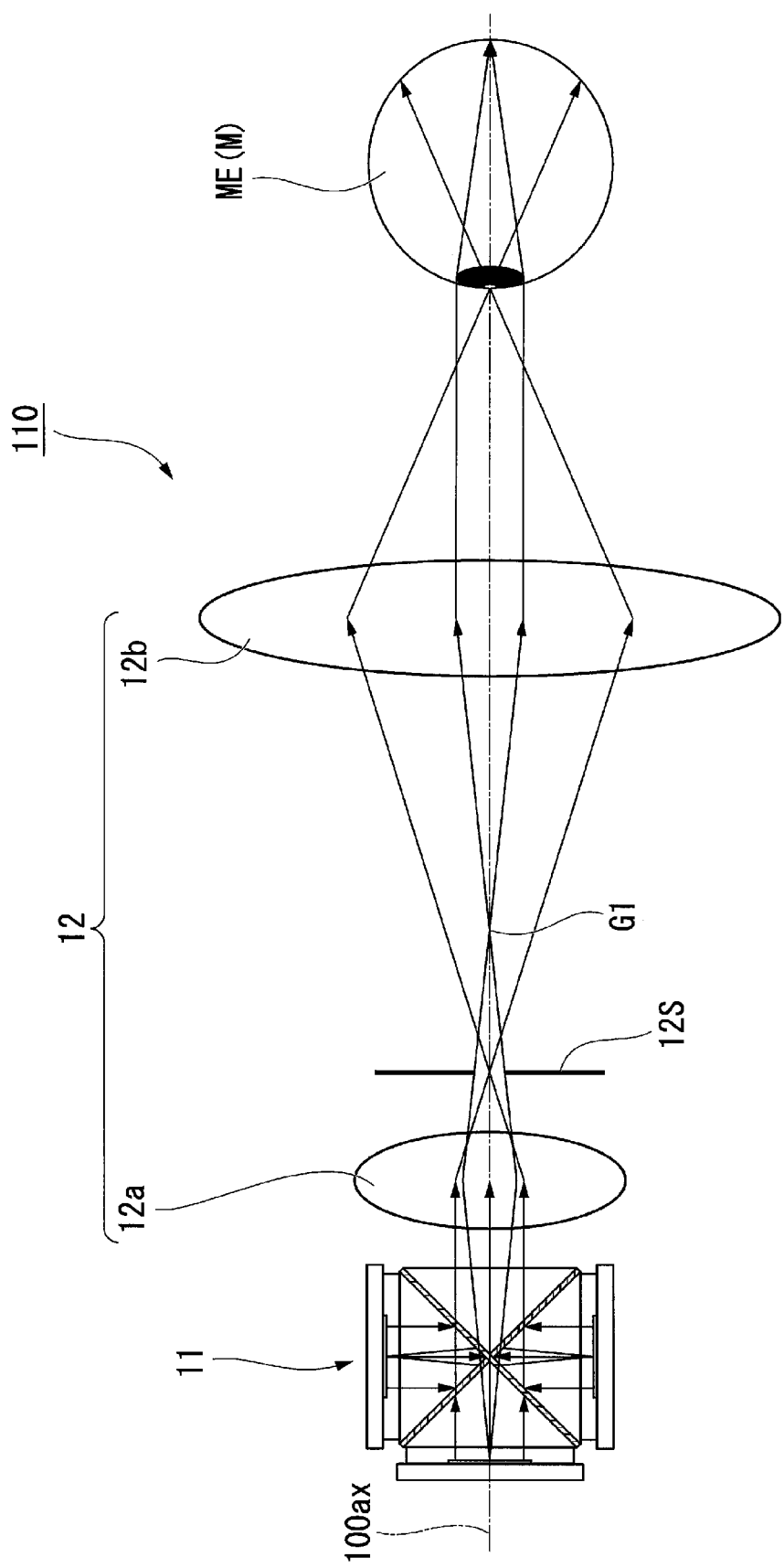
FIG. 3 is a diagram schematically illustrating the configuration of an image display unit.
Figure 4:
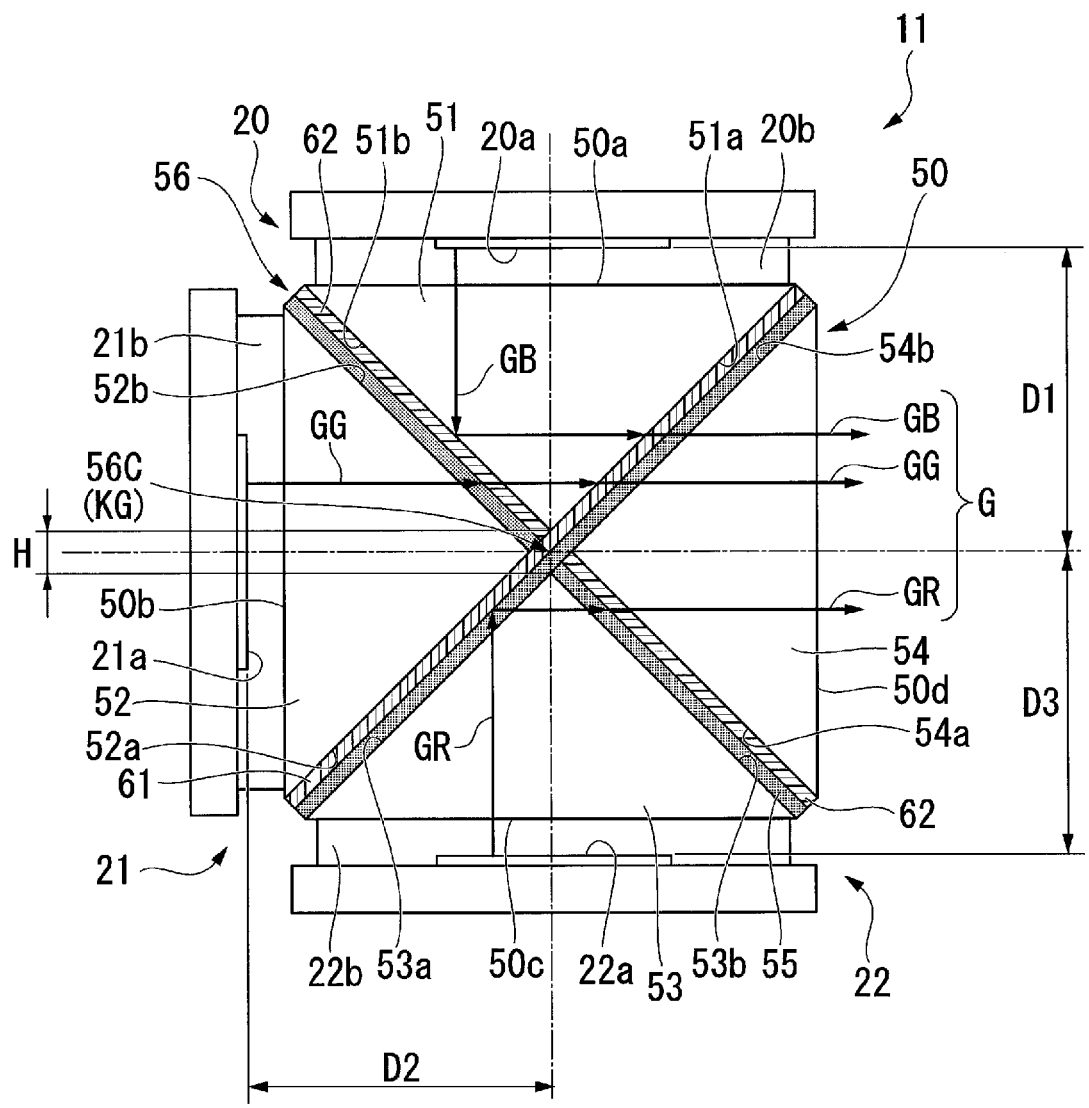
FIG. 4 is a diagram illustrating the configuration of a main part of the image display unit.

FIG. 3 is a diagram schematically illustrating the configuration of the image display unit. FIG. 4 is a diagram illustrating the configuration of main parts of the image display unit in an enlarged manner. Note that, in FIG. 3, a path extending through the center of a pupil of an eye ME of a user M and along which a ray of light forming a central angle of view of an observed image travels is defined as an optical axis 100ax.

As illustrated in FIG. 3, the image display unit 110 includes an image generation unit 11 and a projection optical system 12. The image generating unit 11 emits image light that includes image information.

The image generation unit 11 includes a plurality of display panels 20 and a cross dichroic prism 50. The plurality of display panels 20 include a first display panel 20, a second display panel 21, and a third display panel 22. In this exemplary embodiment, the first display panel 20, the second display panel 21, and the third display panel 22 are constituted by organic EL panels. Using selfluminous panels, organic EL panels in particular, makes it possible to reduce the sizes and weights of the first display panel 20, the second display panel 21, and the third display panel 22. As will be described later, the first display panel 20, the second display panel 21, and the third display panel 22 emit light in different wavelength bands, but otherwise have the same configurations.

As illustrated in FIG. 4, the first display panel 20 includes a light-emission plane 20a that emits blue image light (first image light) GB in a blue wavelength band (e.g., from 450 nm to 495 nm), and a first cover glass 20b that covers the light-emission plane 20a. The light-emission plane 20a corresponds to the surface of a blue organic EL layer that emits the blue image light GB.

The second display panel 21 includes a light-emission plane 21a that emits green image light (second image light) GG in a green wavelength band (e.g., from 495 nm to 570 nm), and a second cover glass 21b that covers the light-emission plane 21a. The light-emission plane 21a corresponds to the surface of a green organic EL layer that emits the green image light GG.

The third display panel 22 includes a light-emission plane 22a that emits red image light (third image light) GR in a red wavelength band (e.g., from 620 nm to 750 nm), and a third cover glass 22b that covers the light-emission plane 22a. The light-emission plane 22a corresponds to the surface of a red organic EL layer that emits the red image light GR.

The cross dichroic prism 50 is an optical element that includes three incidence end planes where the blue image light GB, the green image light GG, and the red image light GR are respectively incident, and that generates color image light by synthesizing the light incident on each of those planes of incidence. In this exemplary embodiment, the blue image light GB, the green image light GG, and the red image light GR do not have polarization characteristics. This is because the blue image light GB, the green image light GG, and the red image light GR are light emitted from organic molecules disposed randomly throughout organic thin films, and thus basically have unpolarized light-emission characteristics, as opposed to the polarization characteristics of a liquid crystal display or the like.

The cross dichroic prism 50 has a square shape when viewed in a plan view, formed by bonding a first triangular prism 51, a second triangular prism 52, a third triangular prism 53, and a fourth triangular prism 54 together so that the apexes of the prisms are located near a central part. The first triangular prism 51, the second triangular prism 52, the third triangular prism 53, and the fourth triangular prism 54 will be called simply "triangular prisms" hereinafter when there is no particular need to distinguish the prisms from one another. Optical glass having a refractive index of 1.5, for example, is used as the material of the triangular prisms.

The cross dichroic prism 50 includes a first plane of incidence 50a on which the blue image light GB emitted from the first display panel 20 is incident, a second plane of incidence 50b on which the green image light GG emitted from the second display panel 21 is incident, a third plane of incidence 50c on which the red image light GR emitted from the third display panel 22 is incident, and a light exit plane 50d from which full-color synthesized image light G, obtained by synthesizing the blue image light GB, the green image light GG, and the red image light GR, is emitted. The first plane of incidence 50a is constituted by one plane of the first triangular prism 51, the second plane of incidence 50b is constituted by one plane of the second triangular prism 52, and the third plane of incidence 50c is constituted by one plane of the third triangular prism 53. The light exit plane 50d is constituted by one plane of the fourth triangular prism 54.

The first display panel 20 is fixed to the cross dichroic prism 50 by the first cover glass 20b being bonded to the first plane of incidence 50a. The second display panel 21 is fixed to the cross dichroic prism 50 by the second cover glass 21b being bonded to the second plane of incidence 50b. The third display panel 22 is fixed to the cross dichroic prism 50 by the third cover glass 22b being bonded to the third plane of incidence 50c. Note that optical glass, having the same refractive index of 1.5 as the triangular prisms, is used as the material of the first cover glass 20b, the second cover glass 21b, and the third cover glass 22b.

The cross dichroic prism 50 further includes a first dichroic film 61 and a second dichroic film 62. The first dichroic film 61 and the second dichroic film 62 are provided between adjacent ones of the four triangular prisms.

Specifically, the first dichroic film 61 is formed on a plane 51a of the first triangular prism 51, which opposes the fourth triangular prism 54, and a plane 52a of the second triangular prism 52, which opposes the third triangular prism 53.

Likewise, the second dichroic film 62 is formed on a plane 51b of the first triangular prism 51, which opposes the second triangular prism 52, and a plane 54a of the fourth triangular prism 54, which opposes the third triangular prism 53.

The cross dichroic prism 50 is configured by bonding the triangular prisms to each other with a light-transmissive adhesive 55. Between the first triangular prism 51 and the second triangular prism 52, the adhesive 55 is provided on a plane 52b of the second triangular prism 52, which opposes the first triangular prism 51.

Between the second triangular prism 52 and the third triangular prism 53, the adhesive 55 is provided on a plane 53a of the third triangular prism 53, which opposes the second triangular prism 52.

Between the third triangular prism 53 and the fourth triangular prism 54, the adhesive 55 is provided on a plane 53b of the third triangular prism 53, which opposes the fourth triangular prism 54.

Between the fourth triangular prism 54 and the first triangular prism 51, the adhesive 55 is provided on the plane 54a of the fourth triangular prism 54, which opposes the first triangular prism 51.

In the cross dichroic prism 50 according to this exemplary embodiment, the first dichroic film 61 and the second dichroic film 62 are formed along side surfaces of the first triangular prism 51, the second triangular prism 52, the third triangular prism 53, and the fourth triangular prism 54 so that the dichroic films intersect with each other at an angle of 45°.

In this manner, the cross dichroic prism 50 includes a bonded part 56 where the four triangular prisms are bonded to each other. The bonded part 56 has a substantially X-shaped planar shape, and includes the first dichroic film 61 and the second dichroic film 62 as well as the adhesive 55.

The first dichroic film 61 transmits the blue image light GB emitted from the first display panel 20 and the green image light GG emitted from the second display panel 21, but reflects the red image light GR emitted from the third display panel 22.

The second dichroic film 62 transmits the green image light GG emitted from the second display panel 21 and the red image light GR emitted from the third display panel 22, but reflects the blue image light GB emitted from the first display panel 20.

In this exemplary embodiment, the first dichroic film 61 and the second dichroic film 62 are constituted by a dielectric multilayer film, for example. Because the blue image light GB, the green image light GG, and the red image light GR are unpolarized light as mentioned above, it is necessary that both P-polarized light and S-polarized light are reflected and transmitted, rather than only S-polarized light or P-polarized light being reflected and transmitted. When the first dichroic film 61 and the second dichroic film 62 are formed in this manner, there is a greater number of films and greater film thickness in the dichroic mirror than when employing a film configuration that reflects/transmits only P-polarized light or S-polarized light.

The cross dichroic prism 50 according to this exemplary embodiment emits, from the light exit plane 50d, the synthesized image light G obtained by synthesizing the blue image light GB emitted from the first display panel 20, the green image light GG emitted from the second display panel 21, and the red image light GR emitted from the third display panel 22.

The synthesized image light G synthesized by the cross dichroic prism 50 is incident on the projection optical system 12. The projection optical system 12 includes a first lens 12a and a second lens 12b. In the projection optical system 12, an intermediate image G1 of the synthesized image light G is generated by the first lens 12a, guided as substantially parallel light by the second lens 12b to the eye ME of the user M, and formed to an image on the retina. The projection optical system 12 includes an aperture stop 12S located at substantially the rear focal point of the first lens 12a, and is therefore object-side telecentric. In the projection optical system 12, the second lens 12b forms an image of the aperture stop 12S near the position of the pupil of the eye ME of the user M, and thus the user M can observe a full angle of view.

Due to this structure, the cross dichroic prism 50 includes a part that is optically imperfect, at a center 56C of the bonded part 56. Here, the part that is optically imperfect (referred as an "optically imperfect part" hereinafter) corresponds to a part where light incident on the cross dichroic prism 50 cannot be correctly synthesized.

The optically imperfect part of the cross dichroic prism 50 will be described in detail next.

In the cross dichroic prism 50 according to this exemplary embodiment, the first dichroic film 61 and the second dichroic film 62 intersect at the center 56C of the bonded part 56. Specifically, the first dichroic film 61 is formed to continue through the area of intersection with the second dichroic film 62, whereas the second dichroic film 62 is formed to be divided at the center 56C of the bonded part 56, which is the location of intersection with the first dichroic film 61.

The second dichroic film 62 is divided by the first dichroic film 61 at the center 56C of the bonded part 56. Only the first dichroic film 61, which reflects the red image light GR but transmits the green image light GG, is provided at the center 56C of the bonded part 56.

Figure 5A:
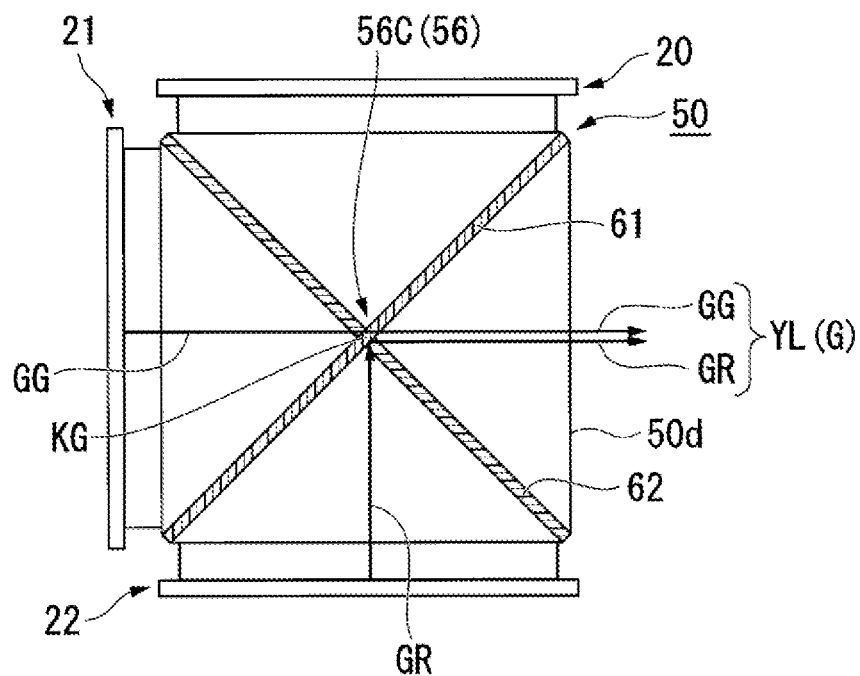
FIG. 5A is a diagram illustrating synthesized image light traveling through an optically imperfect part.

FIG. 5A is a diagram illustrating synthesized image light traveling through the optically imperfect part. Note that in FIG. 5A, the cross dichroic prism 50 is illustrated in a simplified manner, and the adhesive 55 is omitted.

As illustrated in FIG. 5A, in the cross dichroic prism 50 according to this exemplary embodiment, the synthesized image light G emitted from the light exit plane 50d traveling through an optically imperfect part KG, which is present at the center 56C of the bonded part 56, includes only the red image light GR and the green image light GG, and does not include the blue image light GB.

Here, a case where the first dichroic film 61 is divided by the second dichroic film 62, i.e., a case where only the second dichroic film 62 is formed at the center 56C of the bonded part 56, will be considered as a comparison with the configuration according to this exemplary embodiment.

Figure 5B:
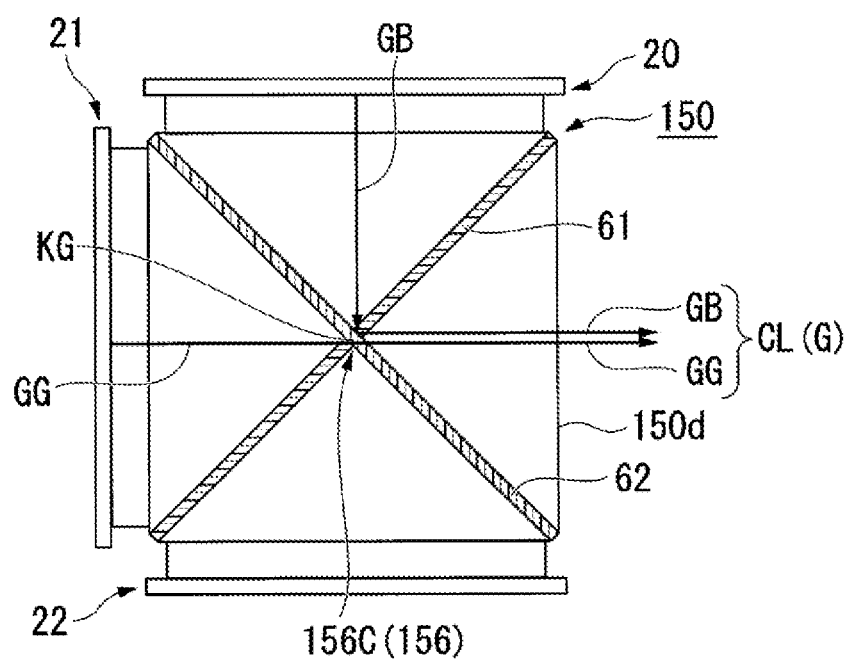
FIG. 5B is a diagram illustrating the configuration of the main part of a cross dichroic prism according to a comparative example.

FIG. 5B is a diagram illustrating the configuration of the main part of a cross dichroic prism according to a comparative example.

As illustrated in FIG. 5B, only the second dichroic film 62, which reflects the blue image light GB but transmits the green image light GG, is provided at a center 156C of a bonded part 156 in a cross dichroic prism 150 according to the comparative example. Accordingly, the synthesized image light G emitted from a light exit plane 150d traveling through the center 156C of the bonded part 156 includes only the blue image light GB and the green image light GG, and does not include red light RB.

When, for example, white light is synthesized as the synthesized image light G by the cross dichroic prism 50 according to this exemplary embodiment, the light traveling through areas aside from the center 56C of the bonded part 56 is correctly synthesized as white light, but the light traveling through the center 56C of the bonded part 56 is synthesized from the red image light GR and the green image light GG as yellow light YL. The yellow light YL traveling through the center 56C of the bonded part 56 does not include the blue color component of the blue image light GB, and thus has a lower brightness than the white light traveling through the parts aside from the center 56C of the bonded part 56. In other words, the center 56C of the bonded part 56 produces a brightness difference in the synthesized image light G emitted from the cross dichroic prism 50. That is, the center 56C of the bonded part 56 is an optically imperfect part that produces a band in the synthesized image light G. The brightness difference produced in the synthesized image light G appears as a "color band" or a "bright/dark band" when the image is viewed. When the optically imperfect part KG at the part where the dichroic films intersect is provided in the second dichroic film 62 in this manner, the light that has traveled through the intersection part is emitted from the cross dichroic prism 50 as the yellow light YL.

On the other hand, when the synthesized image light G is synthesized as white light by the cross dichroic prism 150 according to the comparative example, the light traveling through the center 156C of the bonded part 156 becomes cyan light CL, which is synthesized from the blue image light GB and the green image light GG only. In other words, the cyan light CL traveling through the center 156C of the bonded part 156 does not include the red color component of the red image light GR, and thus the brightness is lower than the white light traveling through the parts aside from the center 156C of the bonded part 156. That is, the center 156C of the bonded part 156 is an optically imperfect part that produces a band in the synthesized image light G. When the optically imperfect part at the part where the dichroic films intersect is provided in the first dichroic film 61 in this manner, the light that has traveled through the intersection part is emitted from the cross dichroic prism 50 as the cyan light CL.

The yellow light YL is brighter than the cyan light CL, and has a brightness close to that of white light. In other words, when displaying the synthesized image light G in which the entire area is white, the yellow light YL has less of a brightness difference than the cyan light CL with respect to the white light.

The image display unit 110 according to this exemplary embodiment achieves a smaller-sized image display unit 110 by disposing the bonded part 56 of the cross dichroic prism 50 in the center of the visual field to shorten the backfocus of the projection optical system 12. In the image display unit 110 according to this exemplary embodiment, the optically imperfect part KG is disposed near the center of the user's visual field, and thus the brightness difference produced by the optically imperfect part KG is more noticeable. However, the cross dichroic prism 50 according to this exemplary embodiment employs a configuration in which the second dichroic film 62 is divided, as described above, which suppresses the brightness difference arising in the synthesized image light G and makes the brightness difference produced by the optically imperfect part KG less noticeable.

Furthermore, in the image display unit 110 according to this exemplary embodiment, a ratio between a width H of the optically imperfect part KG, and aerial conversion lengths D1, D2, and D3 from the respective light-emission planes 20a, 21a, and 22a of the first display panel 20, the second display panel 21, and the third display panel 22 to the center 56C of the bonded part 56, is set to a predetermined range. Accordingly, bands produced by the optically imperfect part KG can be made difficult to see when viewing images.

In this exemplary embodiment, the aerial conversion lengths D1, D2, and D3 are all set to the same value. A method for calculating the aerial conversion length D2 will be described next as an example.

The dimension from the light-emission plane 21a to the center 56C of the bonded part 56 is defined as the sum of the thickness of the second cover glass 21b and half the prism thickness of the cross dichroic prism 50.

In this exemplary embodiment, for example, the second cover glass 21b is 1 mm thick, and half the prism thickness of the cross dichroic prism 50, which is a 10 mm square prism, is 5 mm. As such, the distance from the light-emission plane 21a to the center 56C of the bonded part 56 is set to 6 mm. The refractive indices of the second cover glass 21b and the cross dichroic prism 50 (a triangular prism) are both 1.5, and thus the stated 6 mm is converted into an aerial conversion length.

In this exemplary embodiment, the aerial conversion length D2 is assumed to be 4 mm.

As illustrated in FIG. 4, the width H of the optically imperfect part KG is defined as the dimension of the bonded part 56 in a direction that follows the light exit plane 50d of the cross dichroic prism 50 and that is orthogonal to an axis passing through the center 56C.

In this exemplary embodiment, the width H of the optically imperfect part KG is defined as the sum of (a) multiplied value of the square root of two and the sum of the thickness of the first dichroic film 61 and the thickness of the adhesive 55 and (b) the dimension of the imperfect part at the ridge line shape of the triangular prism (the first triangular prism 51 or the third triangular prism 53). The imperfect part at the ridge line shape of the prism arises as a result of the triangular prism not having a perfect apex due to rounding, flaws, or the like in the material. In other words, the width H of the optically imperfect part KG can be controlled by appropriately adjusting the thicknesses of the dichroic films and the adhesive, or the dimension of the imperfect part of the triangular prism. In this exemplary embodiment, the imperfect part at the ridge line shape of the prism is sufficiently small, and thus the dimension of the imperfect part at the ridge line shape of the prism is ignored. Note that in a case where the refractive index of the adhesive 55 can be made exactly equal to the refractive index of the prism material, only the thickness of the first dichroic film 61 need be taken into consideration with respect to the width H of the optically imperfect part KG.

In this exemplary embodiment, the width H of the optically imperfect part KG is assumed to be 8 μm.

With the image display unit 110 according to this exemplary embodiment, the ratios between the aerial conversion lengths D1, D2, and D3 and the width H of the optically imperfect part KG are assumed to be 500:1 each.

Here, an upper limit for the ratios between the aerial conversion lengths D1, D2, and D3 and the width H of the optically imperfect part KG was also considered. For example, in a case where the stated ratios are set to 2000:1, the width of the optically imperfect part KG is 8 μm, the aerial conversion length is 16 mm, and the thickness of the cover glass is 6.3 mm, which means that the size of the cross dichroic prism is 19.4 mm.

Furthermore, in a case where the pixel pitch in the display panel is 5 μm and the number of vertical pixels is 1080, the length of the display area of the display panel will be 5.4 mm. In other words, the size of the cross dichroic prism, which is 19.4 mm, is unnecessarily large relative to the size of the display area of the display panel. Generally speaking, it is necessary for an HMD to be small, and it is thus desirable that the upper limit of the ratio be set to less than or equal to 2000:1.

The inventors of the present disclosure verified the effects of the image display unit 110 according to this exemplary embodiment through simulations. Specifically, the inventors of the present disclosure used two-dimensional image simulations to obtain images formed at the pupil of an observer while varying the ratio between the aerial conversion length, from the light-emission plane of the display panel to the optically imperfect part, and the width of the optically imperfect part, and then carried out evaluations of the cross-sectional brightness and visual-based sensory evaluations of the image. As a result, it was determined that setting the ratio between the aerial conversion length, from the light-emission plane of the display panel to the optically imperfect part, and the width of the optically imperfect part, to an appropriate range can make bands in the image caused by the optically imperfect part less visible.

The conditions of the simulations were as follows. Because the simulations used an HMD that displays a virtual image, it is necessary to ensure a uniform brightness within a selected solid angle in the pupil of the eye, unlike with a projector, in which the brightness on the screen is uniform. As such, in the simulations, the light of the display panel which uniformly emits light is cut out at the solid angle of the pupil diameter after passing through the optical system and evaluated. Although the pupil diameter varies depending on the brightness, age, and individual differences, in this simulation, a pupil diameter of 3 mm was used as a representative value.

In the simulations, the size of a pixel image and the size of a photoreceptor cell (approximately 3 μm) were brought close to each other. This is because in a case where the pixel image is too large, the pixels will become too apparent and the image will be grainy, whereas in a case where the pixel image is too small, the eye cannot resolve the image and the information of the pixel is wasted. The focal length of the eye is from approximately 16 to 17 mm, and thus it is desirable to set the focal length of the optical system of the HMD as the collimator to be approximately the same length. Because it is necessary for the HMD to be small to be worn on the head, a short focal length may be selected, in which case the focal length is set to from 10 to 20 mm. In the simulations, the F number on the display panel side was set near F5.

FIGS. 6A to 6D are diagrams illustrating evaluation results based on the simulations. Images reproduced through the simulations are illustrated in the upper parts of FIGS. 6A to 6D. In each image, images visually recognized by the pupil of a person while varying the ratio between the aerial conversion length from the light-emission plane of the display panel to the optically imperfect part, and the width of the optically imperfect part, were reproduced through the simulations. Each of the images in FIGS. 6A to 6D is a virtual image of a fully-white display having a resolution of 1280×720, and including a band with a width of 7.5 μm in the single pixel line in the center, with a brightness difference produced by the band being different from image to image.

FIG. 6A corresponds to an image when the ratio between the aerial conversion length and the width of the optically imperfect part is set to 650:1, FIG. 6B corresponds to an image when the ratio between the aerial conversion length and the width of the optically imperfect part is set to 400:1, FIG. 6C corresponds to an image when the ratio between the aerial conversion length and the width of the optically imperfect part is set to 250:1, and FIG. 6D corresponds to an image when the ratio between the aerial conversion length and the width of the optically imperfect part is set to 133:1.

The middle parts of FIGS. 6A to 6D are graphs illustrating the cross-sectional brightness of each instance of image light. In each graph, the horizontal axis corresponds to horizontal direction coordinates of the simulation image illustrated in the upper part. The vertical axis corresponds to the brightness when taking the cross-section of the simulation image illustrated in the upper part, which means that a position higher on the vertical axis indicates a higher brightness.

From the cross-sectional brightness indicated in FIG. 6A, it can be seen that when the stated ratio is 650:1, the band produced in the image causes the brightness to drop by approximately one gradation among 256 gradations. Meanwhile, from the cross-sectional brightness indicated in FIG. 6B, it can be seen that when the stated ratio is 400:1, the band produced in the image causes the brightness to drop by approximately three gradations among the 256 gradations. From the cross-sectional brightness indicated in FIG. 6C, it can be seen that when the stated ratio is 250:1, the band produced in the image causes the brightness to drop by approximately six gradations among the 256 gradations. From the cross-sectional brightness indicated in FIG. 6D, it can be seen that when the stated ratio is 133:1, the band produced in the image causes the brightness to drop by approximately nine gradations among the 256 gradations.

Sensory Evaluation

The inventors of the present disclosure carried out sensory evaluations in which the bands in the images indicated in FIGS. 6A to 6D were evaluated by human eyes. In FIGS. 6A to 6D, a result of "very good" was obtained when the stated ratio was 650:1, a result of "good" was obtained when the stated ratio was 400:1, a result of "fair" was obtained when the stated ratio was 250:1, and a result of "poor" was obtained when the stated ratio was 133:1. Here, "very good" means that the band causes no problems whatsoever, "good" means that the band is not noticeable unless the viewer views the image carefully, "fair" means that the band is visible but is within a permissible range, and "poor" means that the band is problematic.

In other words, it was found that setting the stated ratio to greater than or equal to 250:1 makes it possible to suppress a drop in the gradations to less than or equal to approximately six gradations, which makes it difficult for the band to be seen when the image is viewed by the human eye. It was also found that setting the stated ratio to greater than or equal to 400:1 makes it possible to suppress a drop in the gradations to less than or equal to approximately three gradations, which makes it even more difficult for the band to be seen when the image is viewed by the human eye.

To summarize the evaluation results of the cross-sectional brightness and the sensory evaluation results described above, it was found that the ratio between the aerial conversion length and the width of the optically imperfect part, at which an image in which light and dark bands caused by the optically imperfect part are made difficult to see can be provided, is preferably greater than or equal to 250:1, and more preferably greater than or equal to 400:1.

As described above, in the image display unit 110 according to this exemplary embodiment, the ratios between the aerial conversion lengths D1, D2, and D3 and the width H of the optically imperfect part KG are set to 500:1, i.e., to greater than or equal to 400:1, and thus as indicated by the sensory evaluation result using the results of the above-described simulations, it is possible to make it difficult to see the bands caused by the optically imperfect part KG when viewing the image.

In the image display unit 110 according to this exemplary embodiment, the ratios between the aerial conversion lengths D1, D2, and D3 and the width H of the optically imperfect part KG may be set to greater than or equal to 250:1, and by doing so, and effect can be achieved in which the bands caused by the optically imperfect part KG can be made difficult to see. Thus, according to the HMD 300 of this exemplary embodiment, by including the above-described image display unit 110, the user can therefore view high-quality images that do not have bands of color or bright and dark bands.

Exemplary Embodiment 2

For example, in the image generation unit 11 of the above exemplary embodiment, organic EL display elements are used as the first display panel 20, the second display panel 21, and the third display panel 22. In this case, the blue image light GB, the green image light GG, and the red image light GR emitted from the respective display panels are unpolarized light. As such, it is necessary to use films lacking polarized light separation functionality as the first dichroic film 61 and the second dichroic film 62. A dichroic film lacking polarized light separation functionality in this manner is relatively thick at 5 µm.

An image generation unit according to this exemplary embodiment differs from that in the above exemplary embodiment in that dichroic films having polarized light separation functionality are used as the first dichroic film and the second dichroic film.

Figure 7:
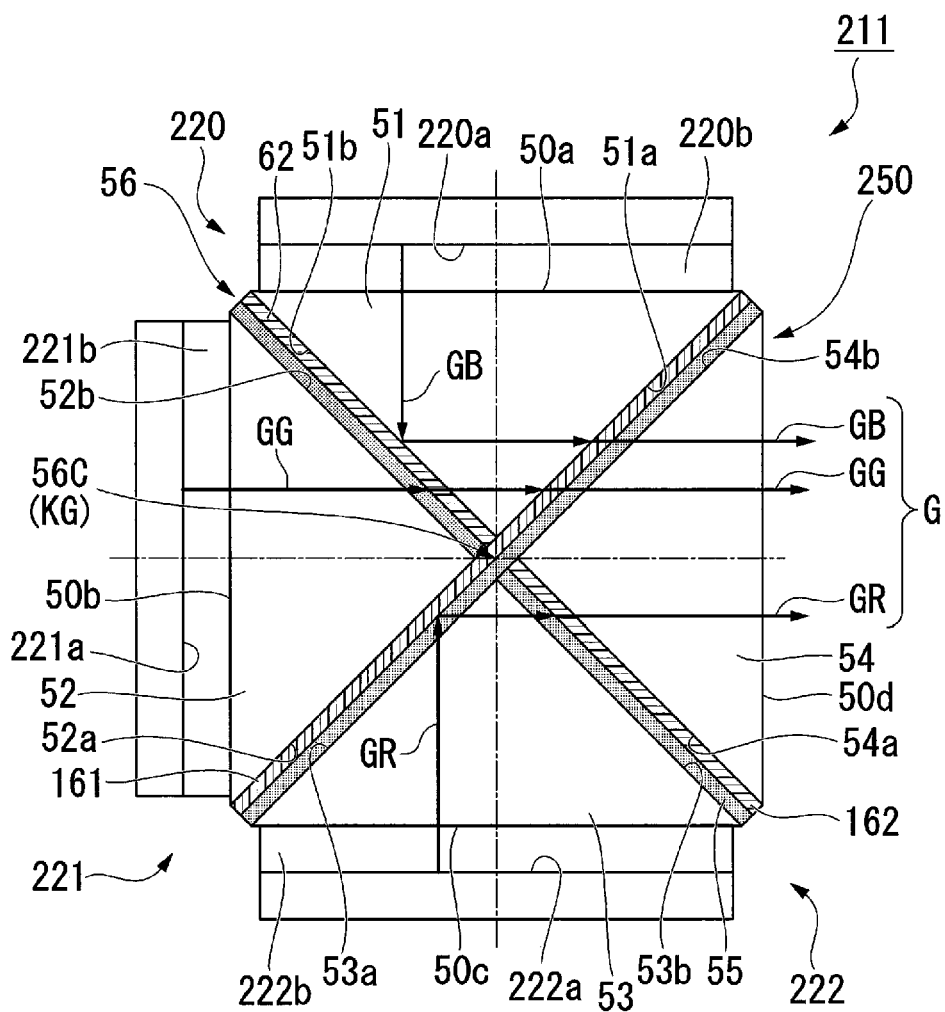
FIG. 7 is a diagram schematically illustrating an image generation unit according to Exemplary Embodiment 2.

FIG. 7 is a diagram schematically illustrating the configuration of an image generation unit according to this exemplary embodiment. Note that elements that are the same as in the above exemplary embodiment are given the same reference signs, and detailed descriptions thereof will be omitted.

As illustrated in FIG. 7, an image generation unit 211 according to this exemplary embodiment includes a first display panel 220, a second display panel 221, a third display panel 222, and a cross dichroic prism 250.

In this exemplary embodiment, the first display panel 220, the second display panel 221, and the third display panel 222 are respectively configured as liquid crystal panels that emit linearly-polarized light as the blue image light GB, the green image light GG, and the red image light GR. In the following descriptions, the first display panel 220, the second display panel 221, and the third display panel 222 may also be referred to as simply "display panels 220, 221, and 222".

The first display panel 220 is constituted by a liquid crystal panel, and includes a light-emission plane 220a that emits the blue image light GB. The light-emission plane 220a is constituted by the surface of the liquid crystal panel. The first display panel 220 is bonded to the cross dichroic prism 250 by a bonding member 220b.

The second display panel 221 is constituted by a liquid crystal panel, and includes a light-emission plane 221a that emits the green image light GG. The light-emission plane 221a is constituted by the surface of the liquid crystal panel. The second display panel 221 is bonded to the cross dichroic prism 250 by a bonding member 221b.

The third display panel 222 is constituted by a liquid crystal panel, and includes a light-emission plane 222a that emits the red image light GR. The light-emission plane 222a is constituted by the surface of the liquid crystal panel. The third display panel 222 is bonded to the cross dichroic prism 250 by a bonding member 222b.

The cross dichroic prism 250 according to this exemplary embodiment differs from the cross dichroic prism 50 according to the above exemplary embodiment in that the cross dichroic prism 250 includes a first dichroic film 161 and a second dichroic film 162. The first dichroic film 161 and the second dichroic film 162 have polarization separation function. To have such polarization separation function, it is necessary for the films to be capable of reflecting and transmitting both P-polarized light and S-polarized light. When the first dichroic film 161 and the second dichroic film 162 are formed in this manner, there is a smaller number of films and lower film thickness in the dichroic mirror than when employing a film configuration that reflects/transmits both P-polarized light and S-polarized light. Accordingly, the first dichroic film 161 and the second dichroic film 162, which have such polarization separation function, are thinner as 3 µm.

With the image generation unit 211 according to this exemplary embodiment, the first dichroic film 161 and the second dichroic film 162 can be made thinner as 3 µm, and thus in case where, for example, the adhesive 55 is 1 µm thick, the width of the optically imperfect part KG is 5.6 µm.

In a case where, in the image generation unit 211 according to this exemplary embodiment, the ratio between the aerial conversion length and the width H of the optically imperfect part KG is 400:1, the aerial conversion lengths from the light-emission planes 220a, 221a, and 222a of the respective display panels 220, 221, and 222, to the center 56C of the bonded part 56, are 2.24 mm. In other words, according to this exemplary embodiment, making the first dichroic film 161 and the second dichroic film 162 thinner makes it possible to reduce the width of the optically imperfect part KG, and thus the aerial conversion length can also be made shorter than in the above exemplary embodiment.

Furthermore, in a case where the refractive index is 1.5 for the triangular prisms constituting the cross dichroic prism 250, and for the bonding members 220b, 221b, and 222b that bond the cross dichroic prism 250 to the respective display panels 220, 221, and 222, the distances between light-emission planes 220a1, 221a1, and 222a1 and the optically imperfect part KG will be 3.36 mm.

Accordingly, in a case where the thicknesses of the bonding members 220b, 221b, and 222b are set to 0.7 mm and the size of the cross dichroic prism 250 is set to greater than or equal to 5.32 mm square, using the first dichroic film 161 and the second dichroic film 162 having polarization separation function makes it possible to reduce the visibility of bands when viewing the image.

Note that the technical scope of the present disclosure is not limited to the above-described exemplary embodiments, and various modifications can be made to the above-described exemplary embodiments without departing from the spirit and gist of the present disclosure.

For example, although the above exemplary embodiments describe cases where the first display panel, the second display panel, and the third display panel are bonded directly to the cross dichroic prism as an example, there may be gaps between the cross dichroic prism and each of the display panels, as long as a configuration in which the distances between each of the display panels and the cross dichroic prism can be kept constant is employed.

Furthermore, a micro LED panel, a Quantum Dot LED (QLED) panel, or the like, which are selfluminous panels, may be employed.

The entire disclosure of Japanese Patent Application No.: 2018-124798, filed Jun. 29, 2018 is expressly incorporated by reference herein.

What is claimed is:

1. A head-mounted display apparatus comprising:
    a cross dichroic prism including:
        a first triangular prism;
        a second triangular prism;
        a third triangular prism;
        a fourth triangular prism;
        a first dichroic film having:
            a first portion provided between the first triangular prism and the second triangular prism along a first direction;
            a second portion provided between the third triangular prism and the fourth triangular prism along the first direction; and
            a third portion provided between the first portion and the second portion; and
        a second dichroic film having:
            a fourth portion provided between the first triangular prism and the third triangular prism along a second direction that intersects the first direction; and
            a fifth portion provided between the second triangular prism and the fourth triangular prism along the second direction;
    a first display panel provided facing a first surface of the first triangular prism;
    a second display panel provided facing a second surface of the second triangular prism; and
    a third display panel provided facing a third surface of the third triangular prism, wherein
    the third portion of the first dichroic film is provided between the fourth portion of the second dichroic film and the fifth portion of the second dichroic film, and
    a ratio between an aerial conversion length between the first display panel and a center of the dichroic prism and a width of the third portion in a third direction that intersects the first direction and the second direction is greater than or equal to 250:1.

2. The head-mounted display apparatus according to claim 1, wherein
    the first portion, the second portion, and the third portion are provided to continue, and
    the fourth portion and the fifth portion are provided separately.

3. The head-mounted display apparatus according to claim 1, wherein
    the ratio between the aerial conversion length and the width of the third portion in the third direction is greater than or equal to 400:1.

4. The head-mounted display apparatus according to claim 1, wherein
    the first display panel is configured to emit first image light in a green wavelength region,
    the second display panel is configured to emit second image light in a red wavelength region,
    the third display panel is configured to emit third image light in a blue wavelength region,
    the first dichroic film transmits the first image light emitted from the first display panel and the third image light emitted from the third display panel, and reflects the second image light emitted from the second display panel,
    the second dichroic film transmits the first image light emitted from the first display panel and the second image light emitted from the second display panel, and reflects the third image light emitted from the third display panel, and
    the second dichroic film is formed divided at an intersecting part where the second dichroic film intersects with the first dichroic film.

5. The head-mounted display apparatus according to claim 4, wherein
    the third portion of the first dichroic film is provided in the intersecting part, and
    light traveling through the intersecting part is emitted from the cross dichroic prism as yellow light.

6. The head-mounted display apparatus according to claim 1, wherein
    the first display panel is configured to emit first image light in a green wavelength region,
    the second display panel is configured to emit second image light in a blue wavelength region,
    the third display panel is configured to emit third image light in a red wavelength region,
    the first dichroic film transmits the first image light emitted from the first display panel and the third image light emitted from the third display panel, and reflects the second image light emitted from the second display panel,
    the second dichroic film transmits the first image light emitted from the first display panel and the second image light emitted from the second display panel, and reflects the third image light emitted from the third display panel, and the second dichroic film is formed divided at an intersecting part where the second dichroic film intersects with the first dichroic film.

7. The head-mounted display apparatus according to claim 6, wherein the third portion of the first dichroic film is provided in the intersecting part, and light traveling through the intersecting part is emitted from the cross dichroic prism as cyan light.

8. The head-mounted display apparatus according to claim 1, wherein the first display panel, the second display panel, and the third display panel are a selfluminous panels.

9. The head-mounted display apparatus according to claim 8, wherein the selfluminous panels are an organic EL panel.

* * * * *